United States Patent Office 3,657,332
Patented Apr. 18, 1972

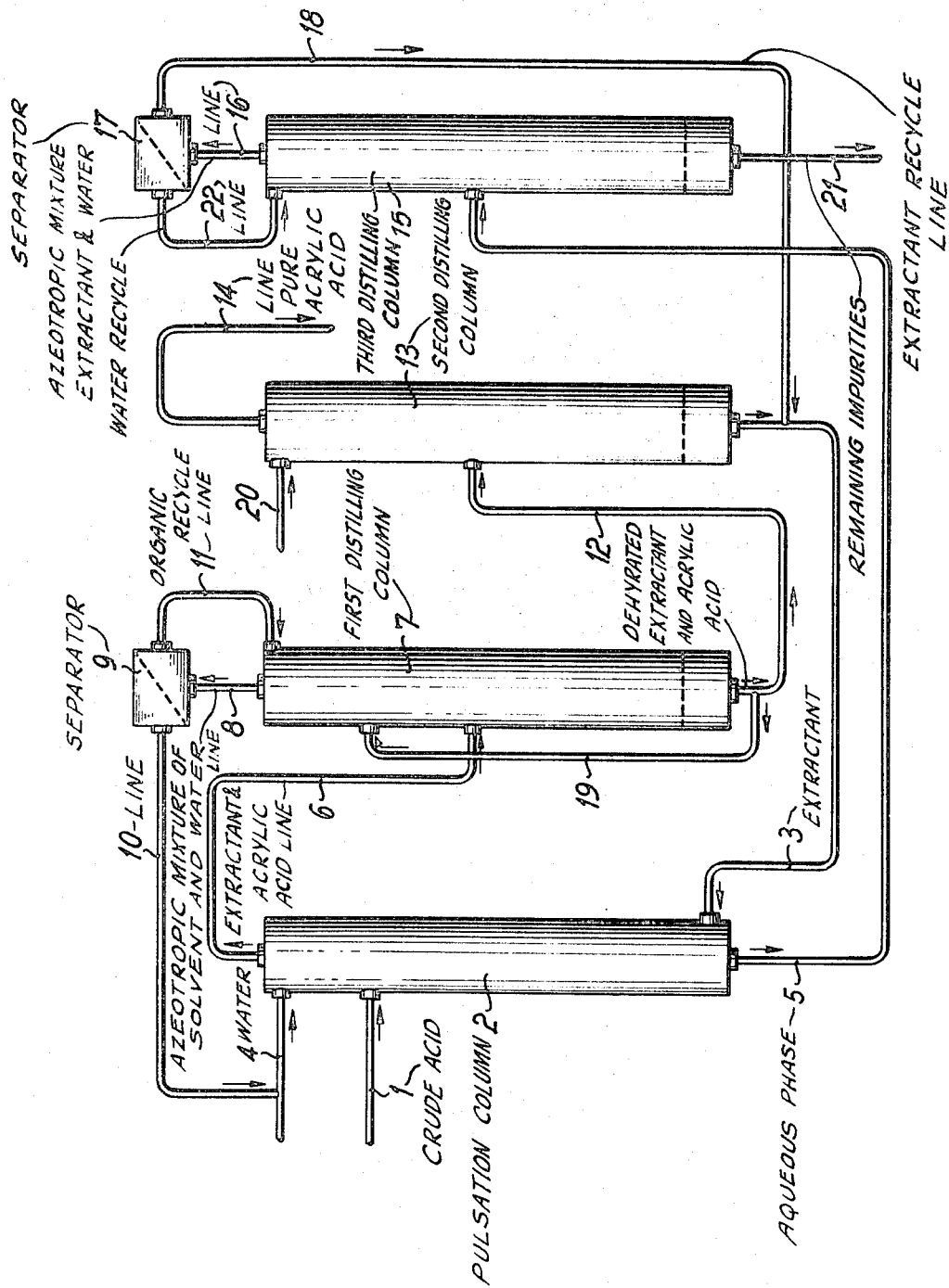

3,657,332
PROCESS FOR ISOLATING ACRYLIC ACID FROM AN AQUEOUS CRUDE ACRYLIC ACID CONTAINING ACETIC ACID BY EXTRACTION AND DISTILLATION WITH AN ENTRAINER-SOLVENT
Kurt Sennewald and Klaus Gehrmann, Knapsack, near Cologne, Heinz Handte, Cologne, Alfred Hauser, Knapsack, near Cologne, and Georg Kohl, Hurth-Burbach, Germany, assignors to Knapsack Aktiengesellschaft, Knapsack, near Cologne, Germany
Filed Oct. 24, 1969, Ser. No. 869,205
Claims priority, application Germany, Oct. 29, 1968,
P 18 05 758.4
Int. Cl. B01d 3/36
U.S. Cl. 260—526 N          10 Claims

ABSTRACT OF THE DISCLOSURE

Process for isolating pure acrylic acid from an aqueous crude acid containing acrylic acid together with small proportions of acetic acid, formaldehyde, acrolein, maleic acid and higher carboxylic acids and possibly polymeric acrylic acid, by extracting the crude acid using an organic solvent, water-washing the resulting organic extract, and distilling the washed extract to isolate acrylic acid therefrom. The aqueous, acrylic acid-containing crude acid is extracted using 3,3,5-trimethylcyclohexanone and/or isophorone, the resulting organic extract is dehydrated in a first distilling zone and base product coming from the first distilling zone is distilled in a second distilling zone to obtain pure acrylic acid.

The present invention relates to a process for separating acrylic acid from aqueous crude acrylic acid containing acrylic acid together with acetic acid, maleic acid, formaldehyde, acrolein and small proportions of polymeric acrylic acid, by extraction using isophorone or 3,3,5-trimethylcyclohexanone or a mixture of these two solvents. The crude acids to be purified preferably include those which are obtained by the catalytic gas phase oxidation of propylene or acrolein.

The aqueous crude acid obtained, for example, by the catalytic gas phase oxidation of propylene or acrolein generally contains up to 40 weight percent acrylic acid, up to 8 weight percent acetic acid, substantially 2 weight percent formaldehyde, 1 weight percent acrolein, 1 weight percent maleic acid and 1 to 3 weight percent polymeric acrylic acid. Various attempts have already been made to isolate acrylic acid from such aqueous solution. More particularly, extraction processes using certain solvents have been reported, but all of them have failed to produce commercially satisfactory results, bearing in mind that especially high yields of acrylic acid having fairly low proportions of acetic acid therein are highly desirable.

For commercial and technical reasons, it is necessary to use a continuous countercurrent extraction process and a suitable extractant for the isolation of acrylic acid from an aqueous crude acid. The countercurrent extraction has been carried out heretofore with the use of aliphatic or chlorinated hydrocarbon extractants or an extractant comprising alcohols, ethers, esters, and ketones; carboxylic acids or lactams have more recently been used to this effect.

Most of the solvents suggested to be used for the extraction have, however, failed to produce fully satisfactory results.

A solvent suitable for the isolation of acrylic acid from an aqueous crude acid has to meet the following requirements, comprising:

(1) A very good solvent power for the acrylic acid,
(2) high selectivity,
(3) chemical inertness with respect to all of the crude acid's constituents,
(4) low solubility in water,
(5) sufficient boiling point difference with respect to acrylic acid,
(6) high boiling point compared with that of the acrylic acid, and
(7) sufficient density difference with respect to the aqueous crude acid.

Referring to the individual requirements:

An extractant with a very good solvent power for acrylic acid enables it to be extracted quantitatively in some few extraction stages using minimum solvent quantities. Hydrocarbons, chlorinated hydrocarbons and ethers with a distribution coefficient of between 0.7 and 1.6 are unsuitable extractants, whilst stronger polar solvents, such as certain esters or ketones, for example, ethyl acetate or methylethylketone with a distribution coefficient of between 2 and 3, meet the above requirement.

The separation factor of a solvent as defined by the quotient of the distribution coefficients of the solvent used for separating the substances is an index of its selectivity. In the case of aqueous acrylic acid, the separation power of a solvent as to the chief constituents thereof, which include acrylic acid and acetic acid, has been found to be critical. Especially high separation factors of between 5 and 10 and hence a very good selectivity have, however, just those solvents, for example ethers, alkanes and alkyl chlorides, whose minor solvent power for acrylic acid makes them unsuitable for use as an extractant. Ketones and esters with separation factors of between 4 and 6 meet the challenge of sufficient selectivity. The further components of the crude acid, comprising formaldehyde, maleic acid and polymeric acrylic acid, which combine very good solubility in water with minor solubility in the usual organic solvents, are easy to separate therefrom.

Conditionally adapted for use in a continuous extraction process are those solvents which chemically react with one or more of the constituents of the material to be extracted, during the extraction or work-up of the extract. Furthermore, the solvent must not affect the acrylic acid to be extracted. Unsuitable extractants are the ethers which tend to form peroxides and thereby favor acrylic acid polymerization. Carboxylic acid derivatives, particularly esters, are also unsuitable solvents, for reasons the same as those set forth above.

In view of the fact that the crude acrylic acid contains between about 50 and 70 weight percent water, it is preferred to use an extractant having a fairly low solubility in water, to avoid losses of solvent which are occasioned by the waste water coming from the extraction step. The recovery, if necessary, of the extractant dissolved in the water, can be effected with particularly little expenditure of energy in those cases in which the extractant forms a low-boiling azeotrope with water.

Most of the solvents heretofore suggested to be used for the extraction of acrylic acid from aqueous crude acid have a boiling point lower than that of acrylic acid. As a result, it is necessary for them to be distilled off from the extract to recover pure acrylic acid. Considerable energy is therefore necessary to recover the extractant bearing in mind that the extract normally has between 70 and 85% extractant therein. In those cases in which a high-boiling solvent, i.e. a solvent boiling at a temperature higher than 180° C., is used, the acrylic acid is distilled off from the extract, following the extraction step and dehydration of the extract. Under optimum conditions, the substantially acid-free extractant is cooled and filtered to be recycled then to the extraction column, without prior expensive purification. To enable this, it is imperative that a solvent be used, which does not or substantially not dissolve unvaporizable, high-boiling constituents of the crude acid, during the extraction step. By subjecting a portion of spent extractant to distillative work-up, it is readily possible to recover extractant with innoxious proportions of contaminants therein.

A satisfactory difference between the density of the crude acid, for example of 1.05, and that of the extractant is a further condition for a continuous extraction process to take a smooth course. An unsuitable solvent, for example, is acetophenone with its density of 1.028.

Earlier processes used for isolating acrylic acid from aqueous solutions generally comprise extraction methods that use extractants which are only conditionally applicable or unsuitable for use, in view of the statements made hereinabove.

In accordance with the art in this filed, it is customary to chiefly use low-boiling solvents, but this is an uneconomic procedure as set forth above. High-boiling solvents have been suggested for use in German Pat. 54,354 and Dutch published specification 6702292. In the first of these two patents, it has been suggested that higher aliphatic carboxylic acids with a minimum chain length of 6 carbon atoms be used as the extractant and that the extraction be partially carried out at elevated temperature, the acrylic acid being distilled off from the resulting extract. The patent is, however, silent as to the separation of acrylic acid and acetic acid, the removal of water from the extracts and the reuse of purification of the extractant. It is questionable therefore whether the carboxylic acid extractants suggested to be used are in fact useful extractants which enable this earlier process to be carried out in continuous fashion.

Dutch published specification 6702292 described a process for the extraction of aqueous crude acrylic acid with the use of high-boiling N-alkyl pyrrolidones. Whilst the alkyl pyrrolidones specified therein have good distribution coefficients and separation factors relative to the separation of acrylic acid and acetic acid, and separation of the two acids is likely to occur in the extraction column, the fact remains that the acetic acid is only insufficiently removed, i.e. at a rate of 83% using two distilling columns. In other words, the acrylic acid produced still contains 2% acetic acid. Not only the removal of the acetic acid but also the distillative removal of water from the extracts, which contain about 20 weight percent water for an acrylic acid content of 15 weight percent, and the distillative purification of a portion of the solvent prior to using it again in the extraction column, are too costly operations in this process. It can also be inferred from the statements made in this patent that the N-alkyl pyrrolidones fail to produce azeotropic mixtures with water, which is disadvantageous. In other words, it is impossible for the extractant dissolved in the waste water coming from the extraction step, namely at the rate of substantially 3.5 grams per 100 grams extracted acrylic acid, to be recovered.

These disadvantageous phenomena which accompany the above earlier process are avoided in the process of the present invention that enables acrylic acid with a purity of between 99.7 and 99.8% to be produced in the yield of 97% from aqueous crude acid.

The process of the present invention for isolating pure acrylic acid from an aqueous crude acid containing acrylic acid together with small proportions of acetic acid, formaldehyde, acrolein, maleic acid and higher carboxylic acids and possibly polymeric acrylic acid, by extracting the crude acid using an organic solvent, water-washing the resulting organic extract, and distilling the washed extract to isolate acrylic acid therefrom, comprises more particularly extracting the aqueous, acrylic acid-containing crude acid with 3,3,5-trimethylcyclohexanone and/or isophorone, dehydrating the resulting organic extract in a first distilling zone and distilling base product coming from the first distilling zone in a second distilling zone to obtain pure acrylic acid.

A preferred feature of the present process comprises extracting the crude acid with the extractant and water-washing the organic extract simultaneously and preferably in countercurrent fashion.

In accordance with a further preferred feature of the present invention the crude acid is extracted using between about 1 and 10 parts by weight, preferably between 2 and 4 parts by weight extractant, per part by weight acrylic acid, and the extract is washed out using between about 1 and 8 parts by weight, preferably between 1 and 4 parts by weight water, per part by weight acrylic acid.

It has also been found that especially favorable extraction effects are produced by carrying out the extraction in a pulsation column at a temperature between about 5 and 20° C.

In order to avoid the polymerization of acrylic acid during the distillative work-up of the extract, it is advantageous for the organic extract and for the base product coming from the first distillation column to be stabilized by means of methylene blue, prior to distilling each of these two materials.

The efficiency of the process of the present invention can be further improved. To this effect, the aqueous phase obtained by extraction of the crude acid is conveniently conveyed to a third distilling zone and extractant dissolved in said phase is separated therefrom in the form of an azeotropic mixture with water. Following phase separation, the extractant is preferably recycled to the extraction zone.

As already mentioned above, the present process can be carried out by using crude acids, such as those obtained by the catalytic gas phase oxidation of propylene or acrolein. The aqueous crude acids may contain, for example, between about 5 and 40 weight percent acrylic acid, between about 0.5 and 8 weight percent acetic acid, between about 1 and 5 weight percent formaldehyde and acrolein, up to about 2 weight percent maleic acid and higher carboxylic acids as well as up to 2 weight percent polymeric acrylic acid.

The physical data of the extractants used in accordance with the present invention, which are critical for the extraction, work-up of the extract and recycle of solvent recovered from the aqueous phase obtained during the extraction, are indicated in the following table:

TABLE

|  | 3,3,5-tri-methylcyclohexanone | Isophorone |
| --- | --- | --- |
| Molecular weight | 140.2 | 138.2 |
| Density | 0.888 | 0.923 |
| Boiling point, ° C | 189 | 215 |
| Viscosity, cp | 2.54 | 2.6 |
| Solubility in water, percent | 0.3 | 1.2 |
| Solubility of water in percent | 1.4 | 4.3 |
| Boiling point of aazeotrope with water,° C | 98 | 99 |
| Water content of zeotrope, percent | 70 | 84 |
| Distribution coefficients in system .../water: |  |  |
| For acrylic acid | 2.25 | 5.5 |
| For acetic acid | 0.45 | 1.3 |
| Separation factor | 5.0 | 4.2 |

The process of the present invention offers a series of advantages over the prior art methods. Thus, for example, it enables acrylic acid with a purity of 99.7% to be isolated in a yield between 96 and 98% from an aqueous acrylic acid solution containing acetic acid as its principal contaminant. In other words, the acrylic acid has a purity sufficient to meet all technical requirements. Despite the fact that the acrylic acid is very pure, the process of the present invention is substantially easier to carry out than prior art methods bearing in mind that only one extraction column is needed for the extraction and isolation of the acrylic acid from the further constituents of the crude acid.

An exemplary mode of executing the process of the present invention will now be described with reference to the accompanying drawing.

The crude acid to be purified, which generally contains between 5 and 40 weight percent acrylic acid, between 0.5 and 8 weight percent acetic acid, between 1 and 5 weight percent carbonyl compounds in the form of formaldehyde and acrolein, between 0 and 2 weight percent maleic acid and higher carboxylic acids, between 0 and 2 weight percent polymeric acrylic acid as well as a stabilizer, for example 0.1 weight percent methylene blue, is introduced through line 1 between the 30th and 40th tray into pulsation column 2 having a total of 60 perforated trays, and extracted in countercurrent fashion at room temperature, using an extract or extract mixture of any desired mixing ratio. The extractant or extractant mixture flows through line 3 into the bottom portion of pulsation column 2. The organic extract which ascends in pulsation column 2 is washed out by means of water flowing countercurrently with respect thereto and supplied through line 4 to the upper portion of pulsation column 2, and an extract containing the solvent together with between 5 and 30 weight percent acrylic acid, between 2 and 15 weight percent water and less than 0.1 weight percent acetic acid as well as a sufficient proportion of methylene blue stabilizer, is removed near the head of column 2 through line 6 which is connected thereto. In first distilling column 7, the extract is distilled under reduced pressure to free it from water and conveyed then through line 12 to acrylic acid column 13. Near the head of distilling column 7 there is withdrawn an azeotropic mixture of solvent and water, which travels through line 8 to separator 9 to effect separation therein into an organic and an aqueous phase. The organic phase is recycled from separator 9 through line 11 to the head of distilling column 7, and the aqueous phase containing between 0.1 and 1 weight percent acrylic acid is returned through lines 10 and 4 to the head of extraction column 2. A small portion of the anhydrous, methylene blue-containing extract coming from distilling column 7 and travelling through line 12 is conveyed through line 19 to the upper portion of distilling column 7 for stabilization of the acrylic acid which has accumulated therein. In the second distilling column 13, the anhydrous extract introduced thereinto through line 12, is distilled under a pressure of less than 100 mm. mercury, and a 99.7 to 99.9% acrylic acid is removed therefrom in a yield of between 96 and 97%, through line 14. The practically acid-free extract is continually withdrawn from the base portion of distilling column 13, cooled and recycled through cycle line 3 to extraction column 2. The material accumulated in distilling column 13 is stabilized by means of a 2% solution of methylene blue in acrylic acid, supplied through line 20. The aqueous phase obtained in the lower portion of extraction column 2, which has a quantity of extractant corresponding to its solubility therein, is delivered through line 5 to third distilling column 15 and distilled therein, preferably at atmospheric pressure, to recover the dissolved extractant. The distillate which escapes in vapor form at the head of column 15 through line 16, is an azeotropic mixture of extractant and water. It is separated into two liquid layers in separator 17. The upper organic phase, consisting of the extractant, is recycled through lines 18 and 3 to pulsation column 2, and the lower aqueous phase is refluxed through line 22 to distilling column 15. The aqueous distillation residue, which is obtained in the base portion of column 15 and contains acetic acid, aldehydes, higher carboxylic acids and polymeric acrylic acid, is removed through line 21.

The extraction waste water coming from pulsation column 2 and travelling through line 5 is substantially free from acrylic acid and contains between 0.3 and 1.2 weight percent extract, depending on the mixing ratio selected for the extractant mixture. Distillation column 15 and apparatus members 16, 17, 18, 21 and 22 can be omitted in those cases in which the above minor proportions of extractant are not recovered.

EXAMPLE 1

21.6 kg. aqueous crude acrylic acid having a methylene blue stabilizer therein containing 20.7 weight percent acrylic acid, 1.7 weight percent acetic acid, 1 weight percent carbonyl compounds and 0.7 weight percent higher and polymeric carboxylic acids were supplied within 72 hours to the 40th perforated tray of pulsation column 2 having a total of 60 perforated trays therein.

The base portion of extraction column 2 was fed with 25.9 kg. 3,3,5-trimethylcyclohexanone extractant and the head portion of column 2 was simultaneously fed, near the 60th perforated tray, with 27.6 kg. water to wash the extract. The extract removed at the head of extraction column 2, which consisted of 82 weight percent 3,3,5-trimethylcyclohexanone, 14 weight percent acrylic acid, 3.9 weight percent water and traces of acetic acid and stabilizer, was dehydrated azeotropically in distilling column 7 under a pressure of 30 mm. mercury at a head temperature of 32° C. During the dehydration, the acrylic acid in the upper portion of column 7 was stabilized using the methylene blue-containing extract coming from the base portion of column 7. The resulting azeotrope of water and 3,3,5-trimethylcyclohexanone with 70 weight percent water therein was separated into two phases, of which the organic 3,3,5-trimethylcyclohexanone phase was refluxed to the head of column 2, whereas the aqueous phase, which contained about 1 weight percent acrylic acid, was recycled to extraction column 2. The dehydrated base product of distilling column 7 was introduced into the lower half portion of distilling column 13 and distilled therein under a pressure of 5 mm. mercury at a head temperature of 32° C. 4.35 kg. of a 99.7% acrylic acid were obtained. This corresponds to a yield of 97% of the theoretical.

The acrylic acid contained 0.1 weight percent acetic acid, 0.1 weight percent 3,3,5-trimethylcyclohexanone and 0.1 weight percent methylene blue as contaminants. The material in distilling column 13 and the distillate were stabilized by the continual addition of small proportions of methylene blue-containing acrylic acid. 3,3,5-trimethylcyclohexanone substantially free from acrylic acid was continually removed from the base of distilling column 13, cooled, filtered and returned to extraction column 2. The aqueous phase, which accumulated in the base of extraction column 2 and consisted of 97.7 weight percent water, 0.4 weight percent 3,3,5-trimethylcyclohexanone, 0.8 weight percent acetic acid, 0.5 weight percent carbonyl compounds, 0.1 weight percent methylene blue and 0.5 weight percent higher and polymeric carboxylic acids, was introduced into distilling column 15 to recover the extractant, and distilled therein at 100° C. at atmospheric pressure. The 3,3,5-trimethylcyclohexanone was found to distill off as an azeotrope with water at a head temperature of 98° C. After separation of the azeotrope into its phases, the recovered 3,3,5-trimethylcyclohexanone was recycled to extraction column 2. The distillation residue leaving the base of distilling column 15 contained about 99% of undesirable by-products, which were initially contained in the crude acrylic acid.

EXAMPLE 2

300 grams of an aqueous crude acrylic acid having a methylene blue stabilizer therein and containing 24.7 weight percent acrylic acid, 2 weight percent acetic acid, 0.7 weight percent carbonyl compounds, and 0.6 weight percent higher and polymeric carboxylic acids were supplied per hour, near the 40th perforated tray, to extraction column 2 having a total of 60 perforated trays. The lower portion of extraction column 2 was fed per hour with 300 grams of an extractant mixture of 3,3,5-trimethylcyclohexanone and isophorone, which were used in the ratio of 3:1. The upper portion of extraction column 2 was supplied near the 60th perforated tray with 350 grams/hr. water to wash the extract. The extract passing over at the head of extraction column 2 contained 18.5 weight percent acrylic acid, 6.6 weight percent water, 74.8 weight percent extractant as well as traces of acetic acid and methylene blue. The extract was worked up in the manner described in Example 1. The average yield per hour was 72 grams acrylic acid containing 0.1 weight percent acetic acid and 0.1 weight percent 3,3,5-trimethylcyclohexanone. This corresponded to a yeld of 97%, based on the quantity of acrylic acid contained in the crude acid. The base product obtained in distilling column 15, from which the extractant dissolved therein was recovered, was found to contain 1 weight percent acetic acid—or 98% of the acetic acid contained in the crude acid—0.5 weight percent carbonyl compounds, 0.3 weight percent higher and polymeric carboxylic acids and 0.2 weight percent acrylic acid.

What is claimed is:

1. In the process for isolating pure acrylic acid from an aqueous crude acid containing acrylic acid together with small proportions of acetic acid, formaldehyde, acrolein, maleic acid and higher carboxylic acids, by extracting the crude acid using an organic solvent, water-washing the resulting organic extract, and dehydrating the resulting organic extract in a first distilling zone and distilling base product coming from the first distilling zone in a second distilling zone to isolate acrylate acid therefrom so that pure acrylic acid is separated and withdrawn at the top of a column and the remaining impurities are withdrawn from the column as a distillation residue, the improvement which comprises extracting the aqueous, acrylic acid-containing crude acid with a member selected from the group consisting of 3,3,5-trimethylcyclohexanone, isophorone and mixtures thereof, to obtain pure acrylic acid.

2. The process as claimed in claim 1, wherein the aqueous crude acid additionally contains polymeric acrylic acid.

3. The process as claimed in claim 1, comprising extracting the crude acid with the extractant and water-washing the organic extract simultaneously.

4. The process as claimed in claim 1, comprising extracting the crude acid with the extractant and water-washing the organic extract in countercurrent fashion.

5. The process as claimed in claim 1, wherein the crude acid is extracted using between about 1 and 10 parts by weight extractant, per part by weight acrylic acid, and the extract is washed out using between about 1 and 8 parts by weight water, per part by weight acrylic acid.

6. The process as claimed in claim 5, wherein the crude acid is extracted using between 2 and 4 parts by weight extractant, per part by weight acrylic acid, and the extract is washed out using between 1 and 4 parts by weight water, per part by weight acrylic acid.

7. The process as claimed in claim 1, wherein the extraction is carried out at a temperature between about 5 and 20° C.

8. The process as claimed in claim 1, wherein the organic extract and the base product coming from the first distillation column are stabilized by means of methylene blue, prior to distilling each of these two materials.

9. The process as claimed in claim 1, wherein the aqueous phase obtained by extraction of the crude acid is conveyed to a third distilling column and extractant dissolved in said phase is separated therefrom in the form of an azeotropic mixture with water and, following phase separation, the extractant is recycled to the extraction zone.

10. The process as claimed in claim 1, wherein the aqueous crude acid contains between about 5 and 40 weight percent acrylic acid, between about 0.5 and 8 weight percent acetic acid, between about 1 and 5 weight percent formaldehyde and acrolein, up to about 2 weight percent maleic acid and higher carboxylic acids as well as up to about 2 weight percent polymeric acrylic acid.

References Cited
UNITED STATES PATENTS

| | | | |
|---|---|---|---|
| 2,526,508 | 10/1950 | Scheeline et al. | 203—15 |
| 2,588,268 | 3/1952 | Mercer et al. | 203—15 |
| 2,922,815 | 1/1960 | Faerber | 260—526 N |
| 3,040,094 | 6/1962 | Stine | 203—15 |
| 3,433,831 | 3/1969 | Yomiyama et al. | 203—15 |
| 3,470,238 | 9/1969 | Asano et al. | 260—526 N |
| 3,488,159 | 1/1970 | Moon et al. | 23—267.3 |

WILBUR L. BASCOMB, Jr., Primary Examiner

U.S. Cl. X.R.

203—8, 15, 62, DIG 21, 95, 71